United States Patent [19]
Dent

[11] Patent Number: 5,566,168
[45] Date of Patent: Oct. 15, 1996

[54] TDMA/FDMA/CDMA HYBRID RADIO ACCESS METHODS

[75] Inventor: Paul W. Dent, Stehag, Sweden

[73] Assignee: Ericsson GE Mobile Communications Inc., Research Triangle Park, N.C.

[21] Appl. No.: 475,303

[22] Filed: Jun. 7, 1995

Related U.S. Application Data

[62] Division of Ser. No. 179,954, Jan. 11, 1994.

[51] Int. Cl.$^6$ ..................................................... H04B 7/204
[52] U.S. Cl. ............................. 370/50; 370/95.3; 370/97; 455/13.3
[58] Field of Search ............................... 370/50, 75, 95.1, 370/95.3, 97, 104.1, 18; 455/12.1, 13.1, 13.3, 13.4, 33.1, 33.3

[56]     References Cited

U.S. PATENT DOCUMENTS

| | | |
|---|---|---|
| 4,586,177 | 4/1986 | Kaul . |
| 4,754,453 | 6/1988 | Eizenhöfer . |
| 4,879,711 | 11/1989 | Rosen ................................... 370/75 X |
| 4,901,310 | 2/1990 | Ichiyoshi . |
| 5,048,059 | 9/1991 | Dent . |
| 5,241,702 | 8/1993 | Dent . |
| 5,276,686 | 1/1994 | Ito . |
| 5,299,192 | 3/1994 | Guo et al. . |
| 5,301,188 | 4/1994 | Kotzin et al. ............................. 370/50 |
| 5,345,439 | 9/1994 | Marston . |
| 5,355,524 | 10/1994 | Higgins, Jr. . |

OTHER PUBLICATIONS

Knick et al., "User Capacity of a Demand–Assigned Satellite Communication System with a Hybrid TD/FDMA Uplink and a TDM Downlink" IEEE Conference: 1981 International Conference on Communications, Denver, CO, pp. 5.1.1–5.6.6 (14–18 Jan. 1981).

Thompson, "Ptarmigan mobile access–freedom of movement for the British Army," IEEE Military Communications Conference: Milcom '85 Conference Record (Cat. No. 85CH2202-0), Boston, MA, pp. 503–509 (20–23 Oct. 1985).

Jiang, "A Comparison Between the Three Mobile Digital Communication Systems," 37th IEEE Vehicular Technology Conference: Quality Requires Work (Cat. No. 87CH2429-9), Tampa, FL, pp. 359–362 (1–3 Jun. 1987).

Bolgiano, "Spectrally Efficient Digital UHF Mobile System" 38th IEEE Vehicular Technology Conference: Telecommunications Freedom—Technology on the Move (Cat. No. 88CH2622-9), Philadelphia, PA, pp. 693–696 (15–17 Jun. 1988).

Primary Examiner—Melvin Marcelo
Attorney, Agent, or Firm—Burns, Doane, Swecker & Mathis, L.L.P.

[57]     ABSTRACT

A radio access method for facilitating communication between at least one first station and a plurality of second stations is disclosed. First, each signal intended for transmission is buffered at a first station. The signals are then divided into equal length segments. The signal segments intended for a particular one of the second stations is transmitted using a corresponding time slot in a regularly repeating time multiplex frame. The signal segments transmitted by the first station are received at at least one of the second stations and the signal segments are assembled from successive corresponding time slots to reconstruct said intended signal. A transmit frequency channel uniquely associated with the corresponding receive time slot is determined at the second station. Finally, a signal intended for transmission to the first station is buffered in the second station and compressed for transmission using the transmit frequency channel during substantially the entire time period that the second station is not receiving.

7 Claims, 11 Drawing Sheets

TDMA/FDMA/CDMA HYBRID RADIO ACCESS METHODS

This application is a divisional of application No. 08/179,954, filed Jan. 11, 1994.

FIELD OF THE INVENTION

The present invention relates to duplex communication systems for cellular radiotelephone systems for simultaneous two way voice communications. The present invention is also relevant to certain simplex systems, for example, landmobile radio systems that provide "press-to-talk" communications facilities between a plurality of correspondents in a radio net. The present invention is also relevant to satellite communications with portable or mobile terminals.

BACKGROUND OF THE INVENTION

The prior art contains several examples of duplex radio communications using Frequency Division Multiple Access (FDMA) in which different radio telephones each have a unique pair of frequencies for transmissions in the transmit and receive directions, for example, the U.S. AMPS cellular telephone system. The prior art also discloses duplex radio communication systems using Time Division Multiple Access (TDMA) in which each radio telephone has a unique time slot on a first shared frequency for communication in one direction, and a second unique time slot on a second shared frequency for communication in the other direction, for example, the European GSM digital system or the U.S. Digital Cellular standard IS-54. In these systems, the time slots in the respective directions are furthermore offset in time from each other so that the portable radiotelephones do not need to transmit and receive simultaneously. This eliminates the need for a transmit/receive duplexing filter which is required by a radiotelephone operating in a FDMA system. Instead, a so-called "time duplex" phone, as envisioned in the prior European Cellular System GSM, uses a simpler transmit/receive switch to couple the antenna alternately to the receiver or the transmitter.

In certain applications, neither TDMA nor FDMA provides an optimal solution. The TDMA system requires higher peak transmitter power to compensate for compressing the transmission into a time slot that is only a fraction of the total time, since it is the mean power that governs the range and quality of the communication. This is not an issue for a base station that in any case must have enough transmitter power to support all mobile stations, and the total power is the same for FDMA and TDMA solutions. It is simpler and cheaper for the TDMA base stations to have one high power transmitter and one antenna which can be timeshared between all base/mobile links using Time Division Multiplexing (TDM). However, it is often inconvenient for TDMA mobile stations to generate high peak power. On the other hand, it is inconvenient for FDMA mobiles to use antenna duplexing filters. Therefore, the present invention seeks to provide a method of using TDM on the base-to-mobile link (downlink) combined with FDMA on the mobile-to-base link (uplink), while avoiding the need for a duplexer.

The prior art discloses examples of mixed TDM/FDMA systems, such as the British Army's PTARMIGAN Single Channel Radio Access System (SCRA). The SCRA system is in fact a military radiotelephone system, and uses TDM on the downlink on a first frequency band while using FDMA on the uplink by allocating a separate frequency in a second frequency band to each mobile uplink. The SCRA system, however, requires either separate antennas for the uplink and downlink, respectively, or a duplexing filter to permit simultaneous transmission and reception through one antenna.

Figure 1:
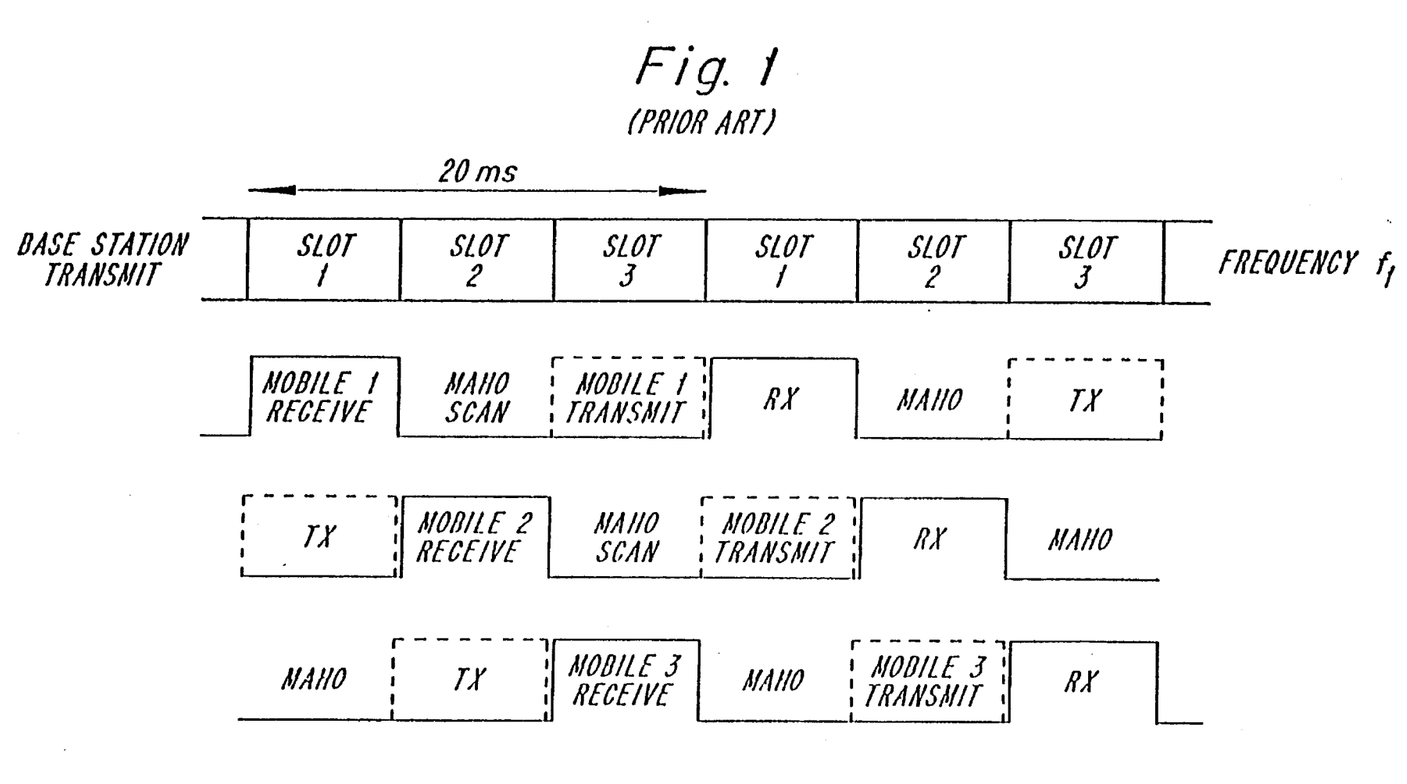
FIG. 1 illustrates a prior art TDMA format.

FIG. 1 illustrate the prior art transmission format described in the U.S. Digital Cellular standard IS-54. A base station transmits information continuously in frames of data which are 20 ms long. The data in question is composed of digitized speech information generated by a digital speech compression algorithm interspersed with synchronization, signalling and control symbols. Each 20 ms frame of data is divided into three time slots and each time slot contains information destined for one of three mobile stations. Thus, a particular mobile station only needs to turn on its receiver for one-third of the time since the data for the particular mobile station is confined to one of three time slots that make up the frame. In the reverse direction, the 20 ms frame is likewise divided into three time slots. Each mobile transmitter uses only one of the two time slots in which it is not receiving, which leaves the other third of the time which can be utilized to scan other base station frequencies to see if another base station is received more strongly. These signal strength measurements are reported over the uplink channel to the current base station, which makes a decision on whether to hand off communications with that mobile station to a stronger base station. Utilizing signal strength measurements performed by mobile stations in making handoff decisions is called "Mobile Assisted Handover" (MAHO).

In this prior art system, it can be seen that a mobile transmits for only one-third of the available time and therefore has to use three times the peak power that otherwise might have been sufficient if continuous transmission had been employed. If continuous transmission had been employed, all three mobile transmissions would be overlapping in time and would therefore have to be given different frequency channels as in the British Army's PTARMIGAN SCRA system. Furthermore, transmit/receive duplexing filters would be needed to allow simultaneous transmission and reception in the mobile station.

SUMMARY OF THE DISCLOSURE

The present invention relates to a radio access method for facilitating communication between at least one first station and a plurality of second stations. First, each signal intended for transmission is buffered at a first station. The signals are then divided into equal length segments. The signal segments intended for a particular one of the second stations is transmitted using a corresponding time slot in a regularly repeating time multiplex frame. The signal segments transmitted by the first station are received at at least one of the second stations and the signal segments are assembled from successive corresponding time slots to reconstruct said intended signal. A transmit frequency channel uniquely associated with the corresponding receive time slot is determined at the second station. Finally, a signal intended for transmission to the first station is buffered in the second station and compressed for transmission using the transmit frequency channel during substantially the entire time period that the second station is not receiving.

The present invention also discloses a radio transmitter/receiver for communicating in both directions with a radio network. The radio transmitter/receiver comprises a timing control unit for sequencing transmit and receive functions. An antenna switch alternately connects an antenna to the receiver and transmitter under the control of the timing control unit. A receiver portion controlled by the timing control unit receives a signal from the radio network during an allocated time slot in the time division multiplex frame period. Finally, a transmitter portion capable of being controlled by the timing control unit transmits during the rest of the time division multiplex frame period when the receiver portion is not receiving.

The present invention also discloses a method of communication for providing telephone communications between at least one outstation and a subscriber in a public switched telephone network comprising at least one orbiting satellite and at least one ground control station in communication with the satellite and the public switched telephone network. First, a signal from the satellite bearing time division multiplex information comprised of time slots in a repetitive TDMA frame period is transmitted, wherein each time slot is allocated for reception by one of the outstations. After receiving signal bursts from the satellite, the outstations determine a transmit frequency channel uniquely associated with said allocated time slot. Finally, the outstation transmits signal bursts using the transmit frequency channel to the satellite using substantially all of the remaining TDM frame during which the outstation is not receiving.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE PREFERRED EMBODIMENTS

In a 3-slot TDMA communication system where the Mobile Assisted Handover feature is not required, but where simultaneous transmitting and receiving is to be avoided so as to eliminate the transmit/receive duplex filter, the present invention extends the transmit duty factor from one-third to two-thirds, thus halving the peak power requirement. The uplink and downlink formats according to the present invention are illustrated in FIG. 2.

Figure 2:
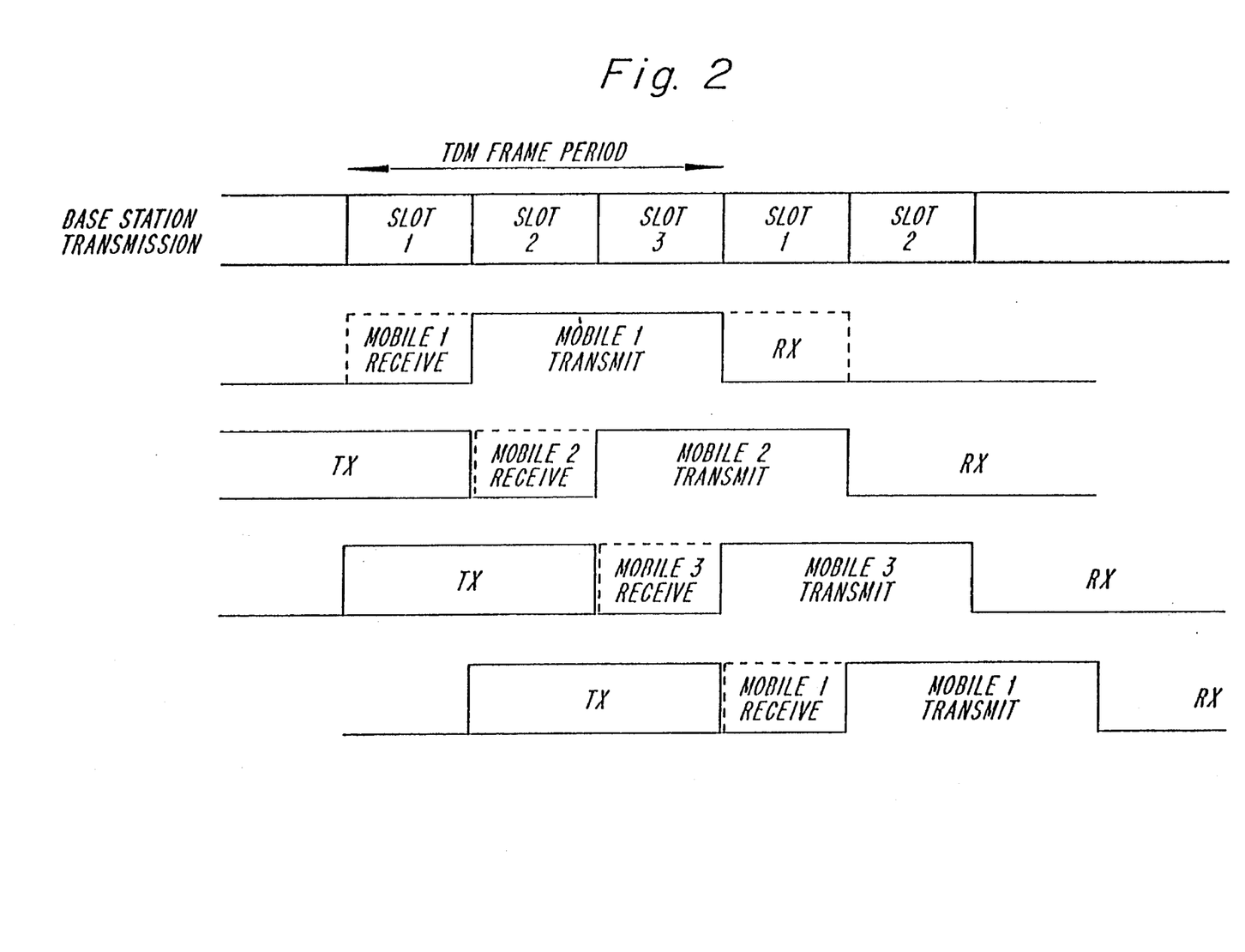
FIG. 2 illustrates a TDM/FDMA format with overlapping mobile transmissions according to one embodiment of the present invention.

As illustrated in FIG. 2, two of the three mobile transmissions overlap at any one time. In order to permit them to overlap in time, they must be made orthogonal, i.e., non-interfering, in some other domain such as the frequency domain. Since using twice the time for transmission allows the transmission data rate to be halved, it is possible to accommodate two transmissions within the same bandwidth by arranging that one of the transmissions uses the top half of an allocated bandwidth while the other transmission uses the bottom half, or vice versa. For example, a first mobile station may use the upper half of the channel bandwidth and halfway through its two-thirds transmit period a second mobile station can start transmitting in the lower half of the channel. Then, after a further one-third of the frame period, the first mobile station will finish using the upper half of the channel and a third mobile station can begin transmitting in the upper half channel. After a further one-third period, the second mobile station will finish using the lower half channel, and the first mobile station can start transmitting again. However, the first mobile station will be operating on the lower half channel instead of the upper half channel it originally operated on. This problem arises only when an odd number of time slot are used in combination with channel bandwidth division by an even number, and may be solved by either of the two methods described below.

The solution in which two mobiles use the upper and lower half channels respectively for two-thirds of the time while a third mobile station uses the upper half channel for its first third of the time and then switches to the lower half channel for its second-third of the time is avoided since the aim of any solution should be that all mobiles function identically independent of time slot. It is preferable, if frequency switching midway through the transmit burst is to take place in any mobile station that it takes place in all mobiles so that the system has a uniform design.

Figure 3:
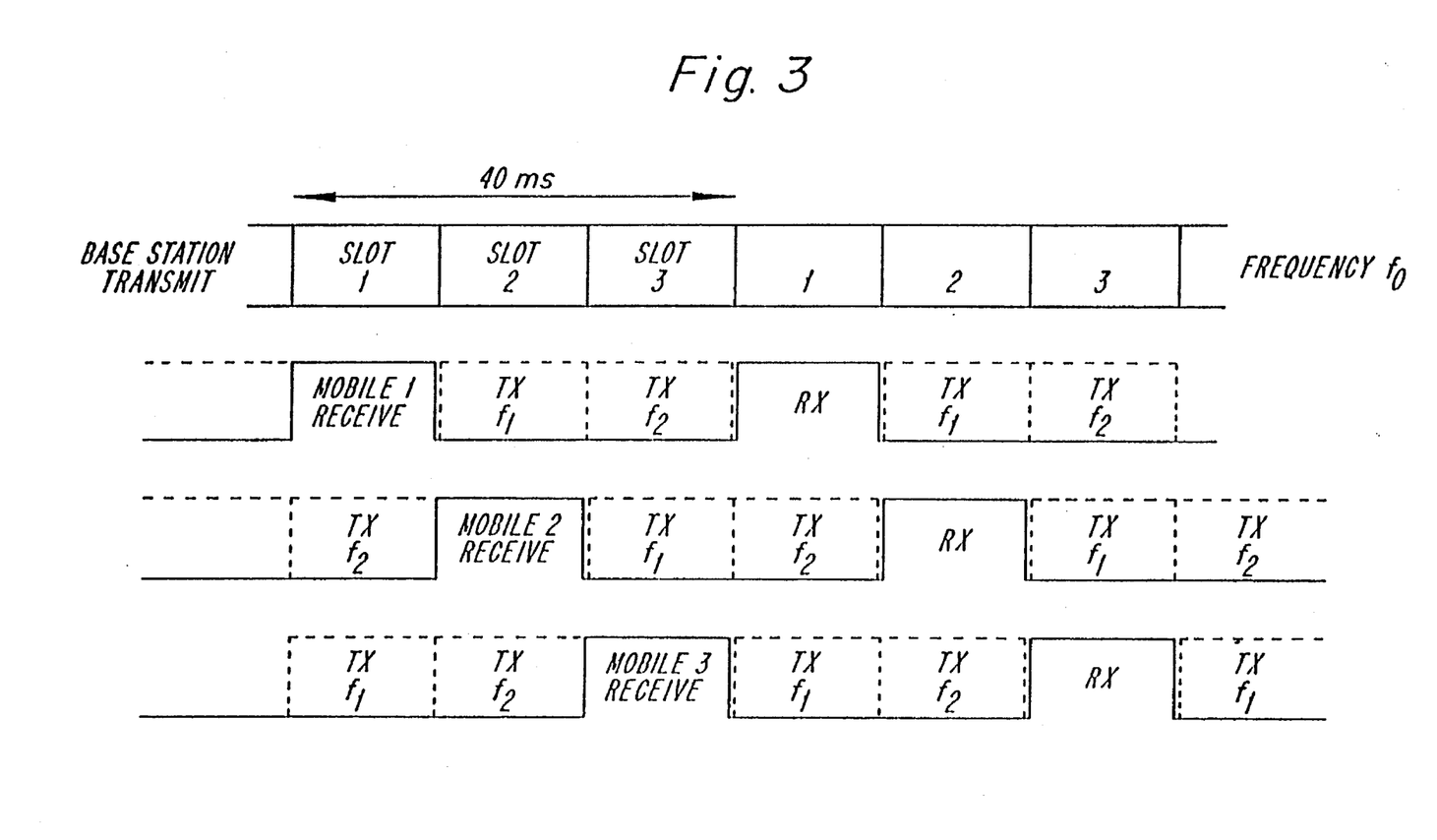
FIG. 3 illustrates a TDM/FDMA hybrid format according to one embodiment of the present invention.

FIG. 3 illustrates one embodiment of the present invention in which a first mobile station receives a first third of the base station transmission and then transmits to the base station using the upper half of the uplink channel for the first one-third of its two-thirds transmit period. After the first third transmit period, the first mobile station switches frequency so as to use the lower half channel for its second one-third transmission period. Meanwhile, a second mobile station has received the second third of the base station's 40 ms frame and starts transmitting in the upper half channel when the first mobile switches to the lower half channel. Then, when the second mobile station switches to the lower half channel midway through its transmit burst, a third mobile station begins transmission in the upper half channel. When the third mobile station switches to the lower half channel, the first mobile station begins transmitting again in the upper half channel. The mid-burst frequency switch from the upper to lower half channel is preferably accomplished not by means of a fast switching frequency synthesizer, but rather by means of applying a systematic phase rotation to the transmitted signal in order to provide a plus or minus frequency offset from the center of the channel. This can be performed within the digital signal processing used for generating the modulation waveforms as will be discussed below.

Figure 4:
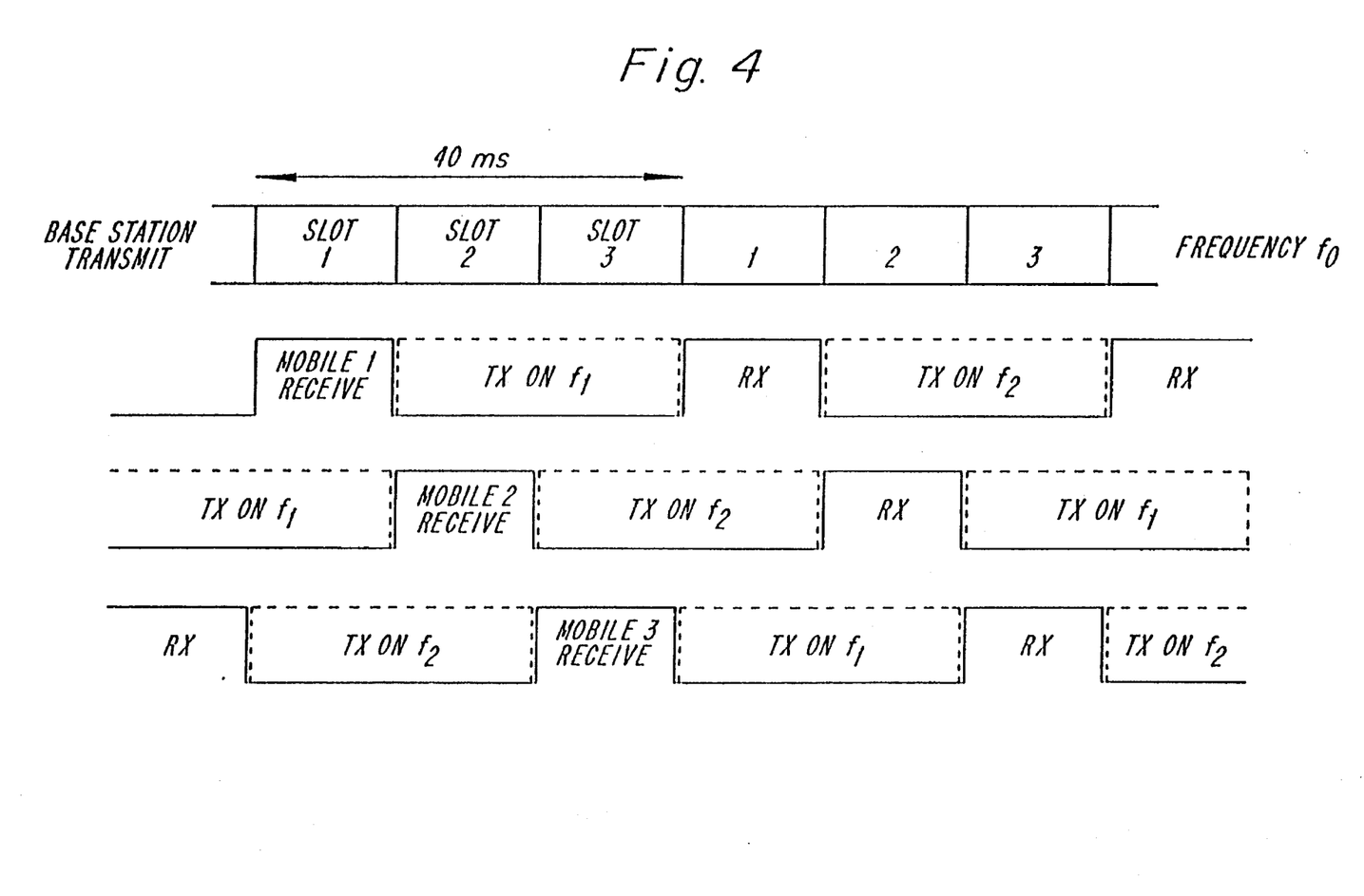
FIG. 4 illustrates a TDM/FDMA hybrid format according to one embodiment of the present invention.

A second embodiment of the present invention, which avoids a mid-burst frequency shift, is illustrated in FIG. 4. Here, a first mobile station first transmits in the upper half channel and halfway through its two-third transmit frame a second mobile station starts transmitting using the lower half channel. Midway through the second mobile station's transmit period, the first mobile station finishes transmission and a third mobile station begins transmitting using the upper half channel. Midway through the third mobile station's transmit period, the second mobile station finishes its transmission on the lower half channel. At this time, the first mobile station begins transmitting again on the lower half channel which is opposite from the channel it initially used. In this embodiment, every mobile functions identically but alternates between transmitting in the upper and lower half channels on successive bursts. In this system, the one-third receive period of 13.3 ms between successive bursts is available for changing the transmit frequency, which can be accomplished by using a frequency synthesizer with a modest frequency changing speed.

It will be appreciated that the invention is not limited to a system with three time slots. When an even number of time slots is used, for example four, and the mobile transmit time is three-fourths of a frame, the transmissions of three mobile stations overlap in frequency at one time. In such a situation, the channel bandwidth can be divided into three, and each mobile station can then use the three subbands in sequence. Alternatively, one mobile can transmit for ⅔ of the time in ½ of the bandwidth, while the other three use the other combinations of half-frame period and half-channel-bandwidth.

The above described solutions are in general characterized by dividing the uplink channel bandwidth into a number of subbands which is at least one less than the number of downlink timeslots 'N'. For example, the three-timeslot case divides the channel into upper and lower halves, while the four-timeslot case divides the channel into three subbands. This is compatible with the reduction in bit rate by the factor (N-1) when the transmitter operates for N-1 timeslots instead of just one timeslot. When N is small, it is difficult to divide the number into N sub-bands without also reducing the bit rate by N instead of only N-1. For example, in the three-timeslot system, it would be difficult to accommodate a half-bit rate transmission, obtained by transmitting only ⅔rds of the time instead of ⅓rd, in only ⅓rd of the bandwidth. This difficulty however disappears when N is large.

Figure 5:
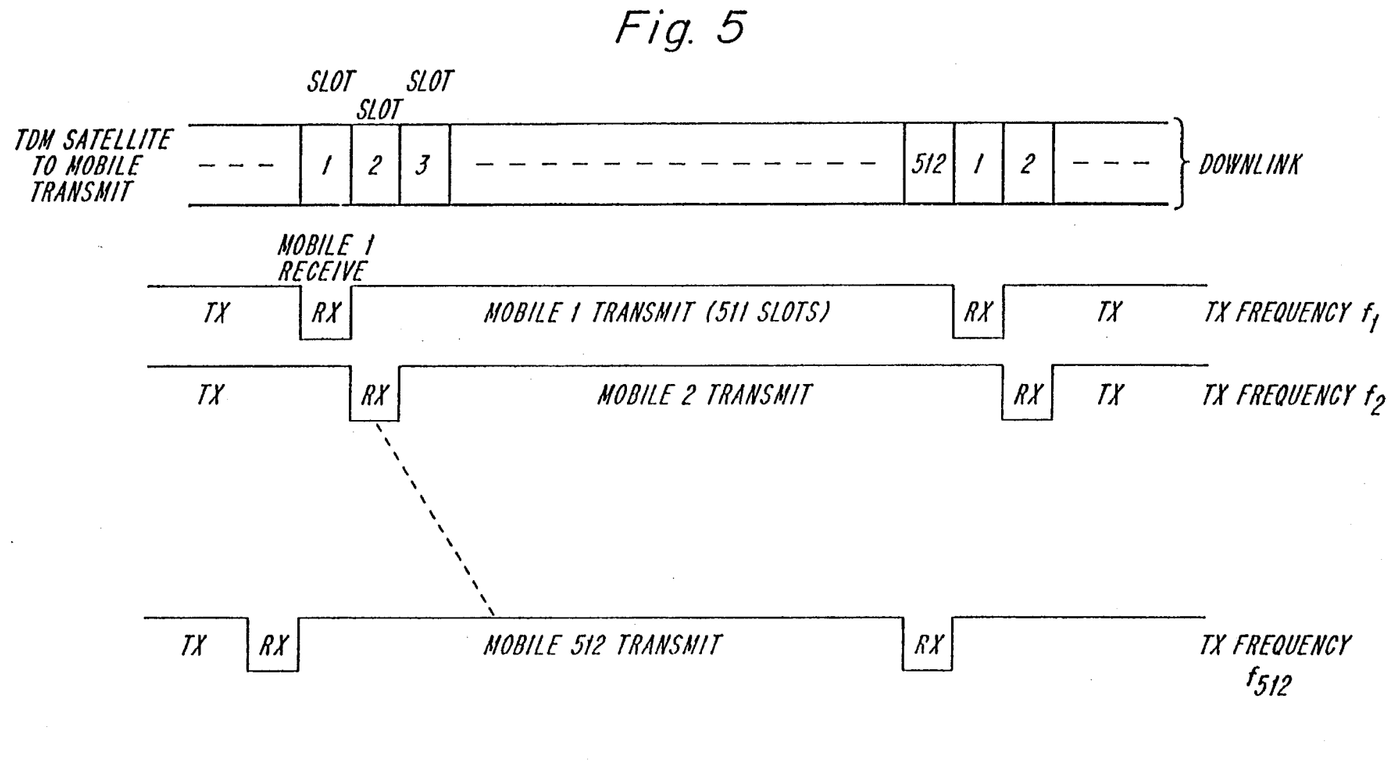
FIG. 5 illustrates the application of the present invention to satellite communications with a large number of time slots.

FIG. 5 illustrates one embodiment of the present invention which may be advantageous for satellite-mobile communications. In this embodiment, a 512-slot TDM downlink is combined with a 512-subband FDMA uplink. To avoid using a duplex filter in the mobile station, the signal for transmission is compressed into $^{511}/_{512}$ths of the time remaining over after the mobile has received its $^{1}/_{512}$th of the downlink TDM format. However, the 0.2% increase in the information rate does not hinder it from being accommodated in $^{1}/_{512}$th of the bandwidth. Without this signalling format, either the mobile would have to transmit and receive at the same time, necessitating a duplex filter which results in undesirable signal losses, or else use TDMA on the uplink involving the mobile transmitting, for example, for $^{1}/_{512}$th of the time using 512 times the peak power which results in an undesirable increase in the peak power and current requirements from the power supply. The present invention may, of course, also in such a case permit transmission for $^{510}/_{512}$ of the time or even less, without severe difficulties, the compression of the information not being restricted to clearing one timeslot for receiving if there are other demands on time, such as providing guard times between transmit and receive.

It can also be advantageous to consider other hybrids of TDMA and FDMA and even CDMA for the uplink in the case of satellite communications. Satellites orbiting at altitudes which are lower than the geostationary altitude exhibit significant velocities relative to stationary or mobile terminals on the ground. This can result in the Doppler shifts of the frequency received at the satellite from the ground terminals that are significant compared with the narrow transmission bandwidths of a pure FDMA uplink. It is therefore sometimes desirable to increase the uplink bandwidth to make Doppler shift relatively insignificant, without reducing the capacity of the system. A small factor increase, such as 2,4 or 8 may often suffice. One method of accomplishing a 2:1 increase in bandwidth while accommodating the same number of transmitters would be for each uplink transmission to be compressed into $^{256}/_{512}$ths of the time on one of 256 available subbands; two transmissions in each subband would then be accommodated by TDMA through a first mobile station's transmitter using the $^{1}/_{512}$th timeslots numbered 1 to 256 and a second mobile station's transmitter using timeslots 257 to 512. The first mobile station receives on timeslot 257, while the second mobile station receives, for example, on timeslot 1, thus avoiding the need for being able to simultaneously transmit and receive. This principle may be extended to 4 timeslots on each of 128 subbands, or 8 timeslots on each of 64 subbands, and so on. However, The mobile station's peak transmitter power must be increased as its duty factor is reduced by using more TDMA and less FDMA on the uplink.

The bandwidth may instead be expanded by the use of Code Divisional Multiple Access (CDMA) on the uplink. In CDMA, each of the original information bits is transmitted a number of times with or without a polarity inversion according to the bits of an access code. For example, a four-times increase in bandwidth is achieved by using the access code 1100 and transmitting, in place of the original bit B1, the sequence B1B1B1B1; B2 is also replaced by B2B2B2B2 and so on, giving a fourfold increase in bit rate. Another mobile transmission may be allowed to overlap this by use of a different access code, preferably an orthogonal code such as 1001. The other mutually orthogonal codes are 1111 and 1010, resulting in four, overlapping, non-interfering transmissions sharing a four times wider subband. This achieves a fourfold increase in uplink signal bandwidth which is desired to render Doppler shift relatively insignificant while preserving capacity without requiring higher peak transmitter powers from the mobile station.

Figure 6:
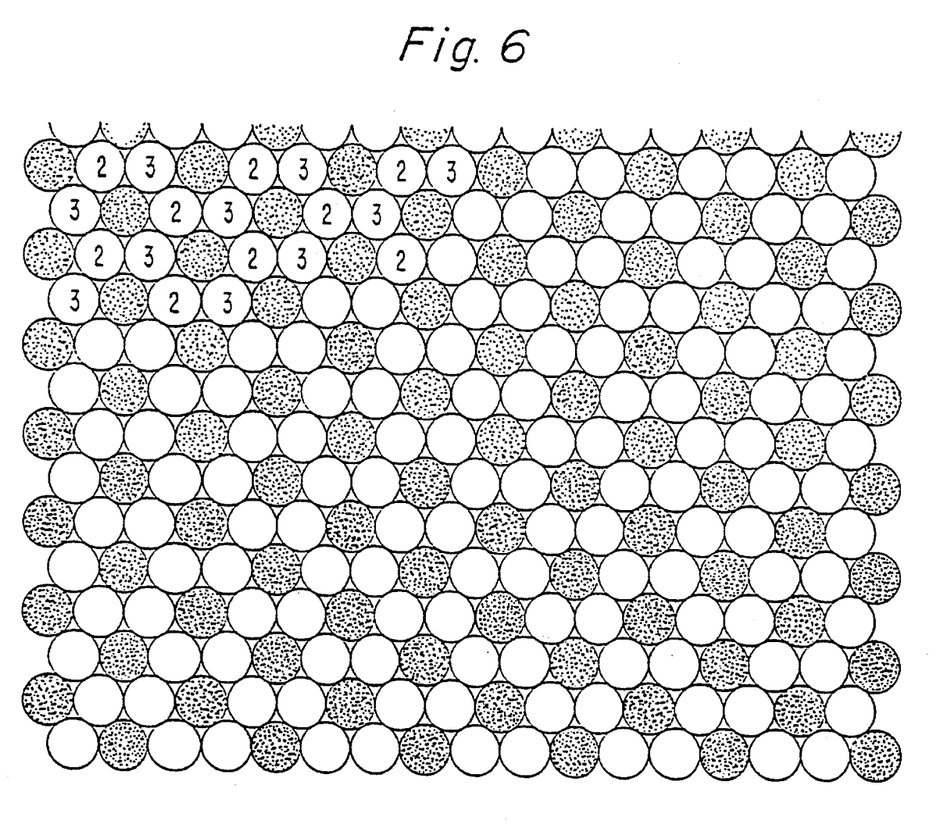
FIG. 6 illustrates a 3-cell frequency re-use plan.

The capacity in a cellular telephone system or in a mobile-satellite communications system, depends on being able to re-use the limited number of allocated frequencies for more than one conversation. The service area to be covered is usually divided into a number of cells each served by a base station (or illuminated by a satellite antenna spot-beam). Ideally, it should be possible to utilize the whole of the allocated spectrum immediately in each adjacent cell, however this is not conventionally possible due to the interference of neighboring cells used in the same frequencies. As a result, a frequency re-use plan must be employed to control interference levels. For example, a so-called 3-cell frequency re-use plan may be employed, as illustrated in FIG. 6. A 3-cell frequency re-use plan guarantees a certain minimum desired Signal-to-Interference (C/I) ratio that may suffice if adequate error-correction coding is employed on the transmitted signal. In general, the C/I is better for a 3-cell reuse plan in the satellite case than in the ground cellular case, due to the sidelobes of the satellite's cell illumination profile tapering off more rapidly out-of-cell than the signal strength reduction with increasing distance in ground propagation.

A problem can arise in applying frequency re-use plans to a TDM downlink. A limited allocated frequency spectrum has to be divided into three to permit a 3-cell re-use plan. As a result, the bandwidth of a full TDM solution can no longer be accommodated. This problem is solved according to an aspect of the present invention, by using a time-reuse plan instead of a frequency reuse plan on the TDM downlink, combined with a corresponding frequency reuse plan on the FDMA uplink.

In the time-reuse plan, cells designated '1' in FIG. 6 are illuminated from the satellite or from their respective ground base stations using the first ⅓rd of the timeslots in the TDM format, using the full available frequency spectrum. The cells labelled '2' then receive illumination during the second ⅓rd of the TDM format, and so-on. In this way, adjacent cells are not illuminated with the same frequencies at the same time, but the full TDM signal bandwidth is still transmitted. For example, in a 512 timeslot TDM format, cells numbered '1' are illuminated for the first 170 time slots. Each mobile terminal, after receiving its respective 1/512th time slot may transmit for the remaining $^{511}/_{512}$ths of the frame using a designated one of the first 170 out of 512 uplink FDMA channels. The cells numbered '2' are then illuminated for the second 170 out of the 512 timeslots, and corresponding mobiles in those cells reply using FDMA and respective uplink channel frequencies 171 to 340. The cells numbered '3' then become illuminated for the third 170 out of 512 timeslots, and their mobiles reply on uplink frequencies 341 to 510. The remaining two timeslots can be reserved for illuminating all cells with a special signal used for paging and call set-up. Likewise, the two correspondingly unused uplink channel frequencies can be reserved for mobiles wishing to initiate contact with the system by performing a so-called random access.

By using the above system of time re-use plans on the downlink combined with a matching frequency reuse plan on the uplink, the described TDM/FDMA hybrid access method can be employed while controlling the interference levels between adjacent cells.

As previously disclosed, it can be desirable to widen the uplink channel bandwidths by employing TDMA or CDMA on the otherwise FDMA uplink and reducing the number of FDMA channels commensurately, in order to correct for Doppler shifts. It will be appreciated by those of ordinary skill in the art that the actual numbers used above are exemplary and do not imply a restriction of the present invention to those examples.

Figure 7:
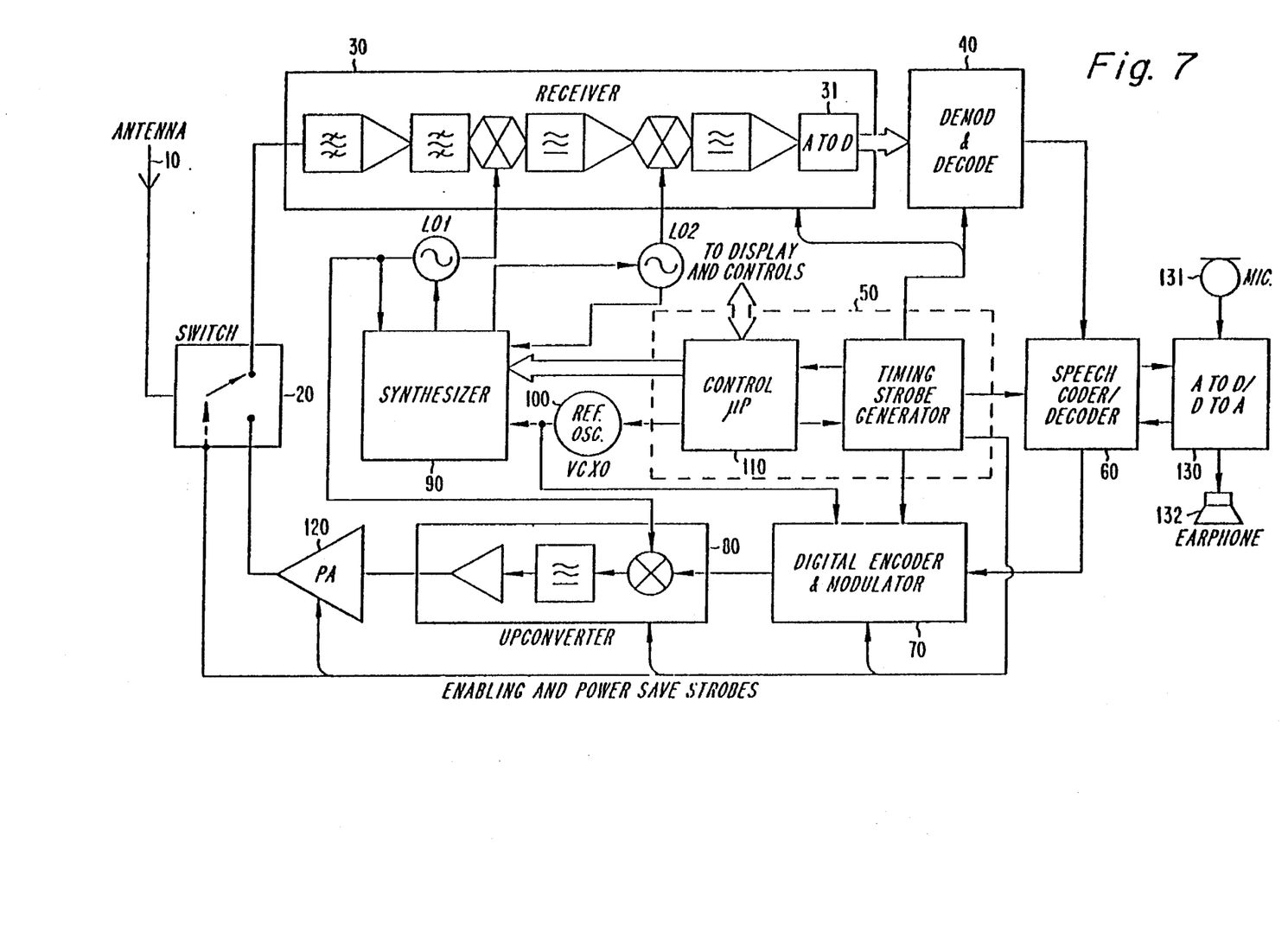
FIG. 7 illustrates a block diagram of a portable radio according to one embodiment of the present invention.

FIG. 7 illustrated a preferred implementation of a mobile or portable radio suitable for use in the present invention. An antenna 10 which operates at both the uplink and downlink frequencies is connected alternately to receiver 30 and transmit power amplifier 120 by means of a T/R switch 20, which is controlled by TDM timing generator 50. In the alternative, transmit/receive duplexing filters can be used if uplink and downlink frequencies are sufficiently separated to permit simple filters with low loss. When uplink and downlink frequencies are widely separated, a single antenna may not be efficient, in which case separate transmit and receive antennas may be necessary. This does not, however, change the principle of the present invention, which is to avoid having the transmitter active during receiving instances.

The timing generator supplies timing and control pulses to the switch 20, the receiver 30 and the digital demodulator and decoder 40 in order to provide them with power to select the signal in allocated timeslots on the downlink. The receiver 30 has sufficient bandwidth to receive the entire TDM downlink signal spectrum, but only one timeslot per 40 ms frame of this bit rate stream is selected for processing in the digital demodulator and decoder 40. During this selected timeslot, the signal from the receiver is digitized in A to D converter 31 and recorded in a buffer memory contained in the demodulator 40. The digitization technique preferably preserves the complex vector nature of the signal, for example, by splitting the real(I) and imaginary (Q) parts by means of a quadrature mixer, and then digitizing each part. An alternative to this so-called I, Q, or Cartesian method is the LOGPOLAR method described in U.S. Pat. No. 5,048,059 which is assigned to the same assignee and is hereby incorporated by reference. Another alternative technique is the co-called homodyne or zero-IF receiver such as described in U.S. Pat. No. 5,241,702 which is hereby incorporated by reference.

The complex vectors recorded in the buffer memory are then processed by the digital demodulator and decoder 40 during the rest of the frame time before collection of the next timeslot's complex signal samples. The demodulation stage of the processing can involve channel equalization or echo-cancelling to mitigate the effects of multipath propagation. Typical algorithms suitable for this are disclosed in U.S. Pat. application Ser. No. 07/964,848 now U.S. Pat. No. 5,295, 112 and U.S. Pat. No. 5,331,666 assigned to the same assignee which are incorporated herein by reference.

To help bridge fading, error-correction encoded data frames may be spread over more than one timeslot by means of interleaving, so that a number of timeslots have to be collected and deinterleaved before the first frame of speech data is error-correction decoded. The demodulation of the signal samples in each timeslot should preferably be optimized together with the error-correction decoding algorithm for best performance at low signal-to-noise ratios, for example, by passing soft-decision information from the demodulator to the decoder, or by combining demodulation with decoding in a so-called decodulator.

After demodulation and error correction decoding, using for example, a soft-decision based convolutional decoder, a frame's worth of error-correction decoded speech data is passed to the speech coder/decoder 60, where it is turned into PCM speech samples at 8 kilo samples/second using a decoder that matches the encoder at the originating transmitter. The speech coding/decoding technique can for example be Residual Pulse Excited Linear Predictive Coding (RELP) or Code Book Excited Linear Predictive Coding (CELP) which compresses an 8 kilo sample/second PCM voice signal down to 4.2 kilobits/second at the transmitter, and conversely expands the 4.2 kilobits/second signal from the decoder 40 to 8 kilobits/second PCM signal again for D to A conversion in D to A convertor 130 and audio amplification for driving an earphone 132.

In principle, the receiver only needs to receive a single frequency on which all signals from all mobiles are multiplexed and modulated. As a result, the receiver does not have to tune to alternative frequencies, but rather, selects between all available timeslots. The control microprocessor 110 receives information on a calling/paging slot during call set-up designating the slot to be used for the call. The control microprocessor 110 then programs the timing generator accordingly, to generate all control pulses necessary to power the receiver and transmitter on and off according to the inventive TDM/FDMA hybrid formats described herein. The control microprocessor also programs the transmit synthesizer 90 to generate an FDMA channel uplink frequency associated with the allocated downlink timeslot with the help of upconvertor 80. The upconvertor 80 can operate in several manners. First, the upconvertor 30 can operate by mixing a fixed modulated frequency (TX IF) with the variable frequency produced by a programmable frequency synthesizer to generate a sum or difference frequency at the desired transmit channel frequency, wherein either the sum or the difference is selected by a filter. In the alternative, the upconvertor 80 can operate by mixing a signal from a voltage controlled oscillator with the synthesizer frequency to produce a difference frequency that is phase-compared to the fixed modulated frequency in a phase error detector, the phase error then being amplified and applied to the VCO in order to lock it to the modulated TX IF, thus causing the VCO phase to follow phase modulation on the TX IF. The determination of which method to select depends on whether the selected transmit modulation technique is pure phase modulation, i.e., constant amplitude modulation, or whether the selected modulation involves a varying amplitude component.

In the reverse direction, a speech signal from the microphone 131 is first amplified and converted to 8 kilobit sample/second PCM using A to D convertor 13 and then compressed to a reduced bit rate using the speech coder 60. Speech compression techniques such as RELP and CELP that compress speech to as low as 4.2 kilobit samples/second generally operate on 40 ms frames of speech samples at a time. A frame is typically compressed to 163 bits, that are then error-correction coded in digital encoder 70 before being modulated onto a radio frequency. The modulated radio frequency may be a fixed intermediate frequency locked to an accurate reference oscillator 100. The signal is then upconverted in upconverter 80 by mixing with transmit synthesizer 90 to the final uplink frequency signal which is then amplified by transmit power amplifier 120 and passed by the switch 20 to the antenna 10. The digital encoder and modulator 70 includes buffering (and if used, interleaving) in order to compress the transmission into the available time left over after receiving the downlink timeslot, so as to implement the aspect of the present invention, thus avoiding simultaneous transmitting and receiving. The timing of this compression, modulation, and activation and deactivation of the power amplifier at appropriate instances is also controlled by timing generator 50 so as to achieve the coordination between transmit and receive timing.

In some applications, the receiver may have to be able to tune to alternative channel frequencies as well as to select between the TDM timeslots on those channels. In those instances, the receiver 30 would also contain a frequency synthesizer programmed by control microprocessor 110 and locked to the accuracy of the reference frequency oscillator 100. The allocated frequency is given over a calling or paging channel at call set-up.

In landmobile radio applications using a push-to-talk operation, the mobile terminal may be a member of a group or net of correspondents sharing a trunked radio system with other groups. In trunked systems, all idle radios listen to a call set-up channel. When a radio transmits by activation of the talk switch, a short message is transmitted on the corresponding call set-up uplink channel requesting a channel allocation. The receiving base station network immediately replies on the downlink call set-up channel with a currently idle frequency/timeslot allocation to which the mobile terminal then adapts for the rest of the transmission. When the press-to-talk switch of the transmitting radio is released, an end of message signal is transmitted to expedite the reversion of the base network and other members of the group to idle mode in which they listen to the call set-up channel. This procedure is fast and automatic, within a fraction of a second, so that it is completely unseen to the human operators.

In cellular or satellite telephone applications, idle mobile terminals listen to a particular timeslot/frequency designated by the calling/paging channel. Moreover, transmissions on the calling/paging channel timeslot may be further submultiplexed to form less frequently repeated slots each associated with particular groups of mobiles, designated, for example, by the last few digits of their respective telephone numbers. These so called sleep mode groups are only paged in a particular submultiplex slot, which control microprocessor 110 is able to identify from received data and can thus program the timing generator 50 to wake up the receiver only at these instances, which results in considerable standby power current consumption savings.

Furthermore, the digital demodulator/decoder 40 can, after processing of each new received timeslot, produce an estimate of the frequency error of the receiver caused by inaccuracies of the reference oscillator 100 as well as Doppler shift, which can be significant in satellite systems. By using broadcast information from a satellite, the microprocessor 110 can correct for the Doppler shift and determine the error due solely to reference oscillator 100. The microprocessor 110 can then correct the error by sending a correction signal such as a tuning voltage to the oscillator, in order to insure that the transmit frequency which is referenced to the reference oscillator by transmit frequency synthesizer 90 is accurately generated. The process of correcting for Doppler shift involves determining the position or bearing relative to the satellite's orbit by utilizing any or all of the following parameters: measured rate-of-change of Doppler shift; satellite and antenna beam identification signals; broadcast information on the satellite's instantaneous three dimensional coordinates; previous mobile terminal position; elapsed time since last position estimate; and mobile terminal velocity.

In addition to the frequency correction mechanism mentioned above, the demodulator produces information on the position of signal samples in the buffer memory deemed to correspond to known sync symbols, which yields information on the accuracy of the timing produced by the timing generator 50. The microprocessor 110 performs sanity checks on this information and then uses it, if deemed valid, to demand small timing corrections of the timing generator 50 so as to correct for any drift.

Figure 8:
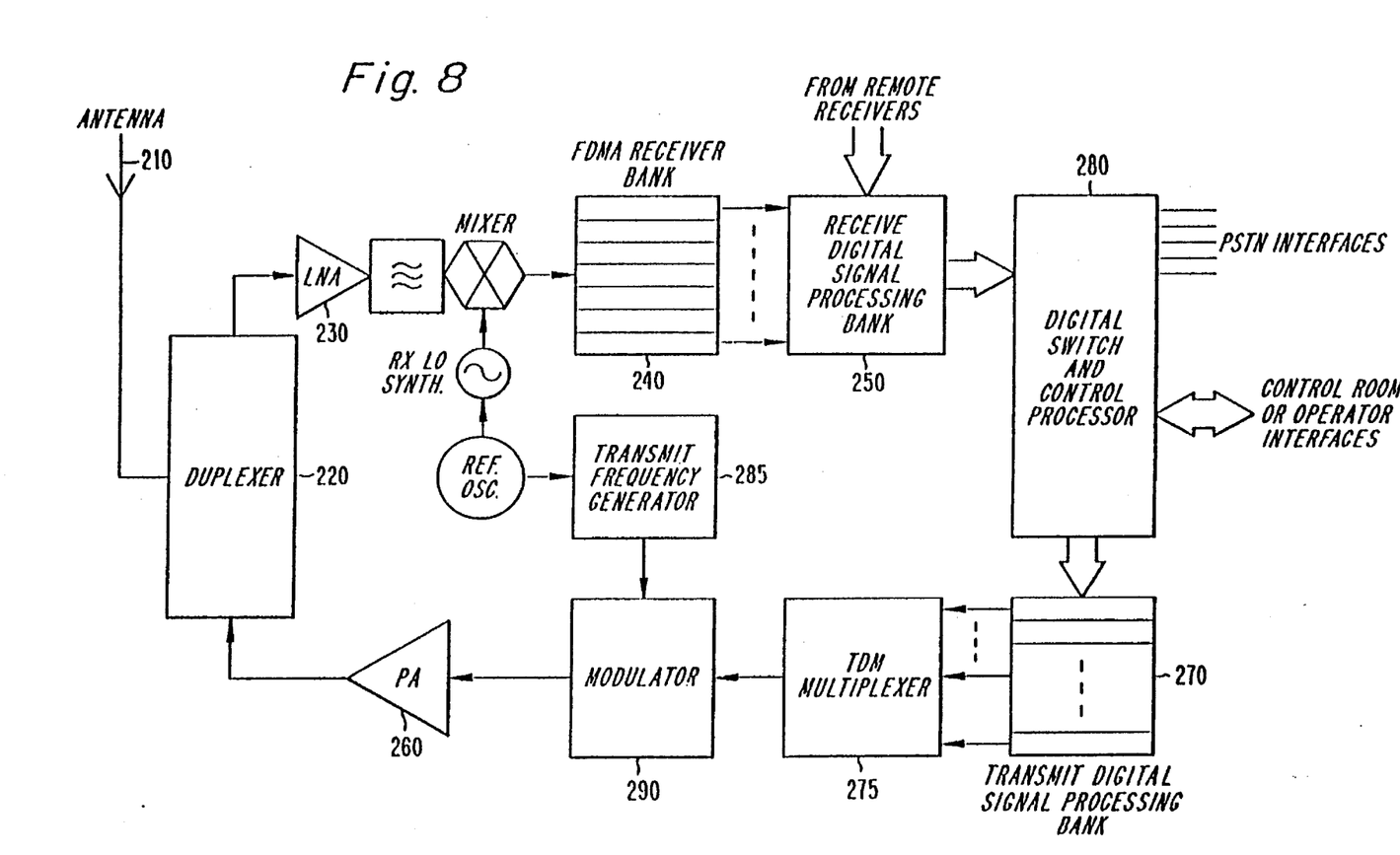
FIG. 8 illustrates a base station for one embodiment of the present invention.

FIG. 8 illustrates a block diagram of a base station implementation suitable for use in the present invention. A common antenna 210 is connected to a receiver low noise amplifier 230 and a transmit power amplifier 260 by a duplexing filter 220. The low noise amplifier passes the entire uplink frequency band to a bank of FDMA channel receivers 240. After digitizing the signal in each channel using one of the aforementioned complex vector digitizing techniques, the signals are processed in a bank of receive Digital Signal Processing devices 520 in order to perform demodulation and equalizing, error correction decoding, and speech decoding for each active channel. The resulting 8 kilobit samples/second speech signals are then time multiplexed using a standard digital telephone standard such as the T1 format for convenient connection to a digital switch or exchange 280 such as the ERICSSON AXE switch.

An alternative to the analog implementation of the FDMA receiver bank is to digitize the entire composite signal and to process it digitally to separate the individual FDMA signals. This is practical so long as the signal strength differences between the signals are not too great for the A to D convertor's dynamic range. Another aspect of the present invention is the inclusion of power control means to restrict the signal level differences between different FDMA signals in order to facilitate digital implementation of the FDMA receiver filter bank with potential simplification of the base station. The power control means proposed is known to the prior art and is based on the mobile stations assuming correlation between the signal strength they receive from the base station and the signal strength the base station receives from them. Thus, an increase in signal strength received from the base station is acted upon by a mobile station by reducing its transmitter power and vice versa. This is complemented by a slower power control means at the base station which includes up/down power control information in the signalling samples interleaved with voice symbols in each mobile station's timeslot.

The exchange/switch 280 selects between uplink signals received from the public switched telephone network or signals from an operator or control room for transmission on the downlink, according to call set-up information, requested routing, or preset information. The switch 280 supplies the selected signals multiplexed together according to some known digital telephone trunk such as T1 and delivers the signals to the transmit DSP bank 270. The transmit DSP bank separately encodes each speech signal in the multiplex stream using a voice compression algorithm such as RELP or CELP. The transmit DSP bank then error correction codes the signals and remultiplexes the signals into the downlink TDM format for modulation using modulator 290 onto the downlink radio frequency and amplification using high power amplifier 260. The switch 280 also extracts call setup information for the uplink calling channels and inserts call setup information corresponding to paging slots in the downlink TDM format. This information is identified as data and not as speech to the respective DSP devices so that it bypasses RELP coding and instead is subjected to a more powerful form of error correction coding.

A land based system may furthermore include separate antennas and associated receive signal processing in order to effect space-diversity reception to improve range and to combat fading. The combination of signals processed from remote antennas with signals processed with antenna 210 can take place either within the demodulation and equalizing algorithm, or by means of a simple diversity selection on a speech frame by speech frame basis according to signal quality. Likewise, in the transmit direction, a second distant transmitter may receive signals from transmit DSP bank 270 for transmitting on the same frequency so as to improve area coverage. The mobile receiver illustrated in FIG. 7 is able by means of its equalizing demodulator algorithm to perceive delayed signals received from a second transmitter as echoes of the first transmitter and to utilize these signals in order to improve reception.

Figure 9:
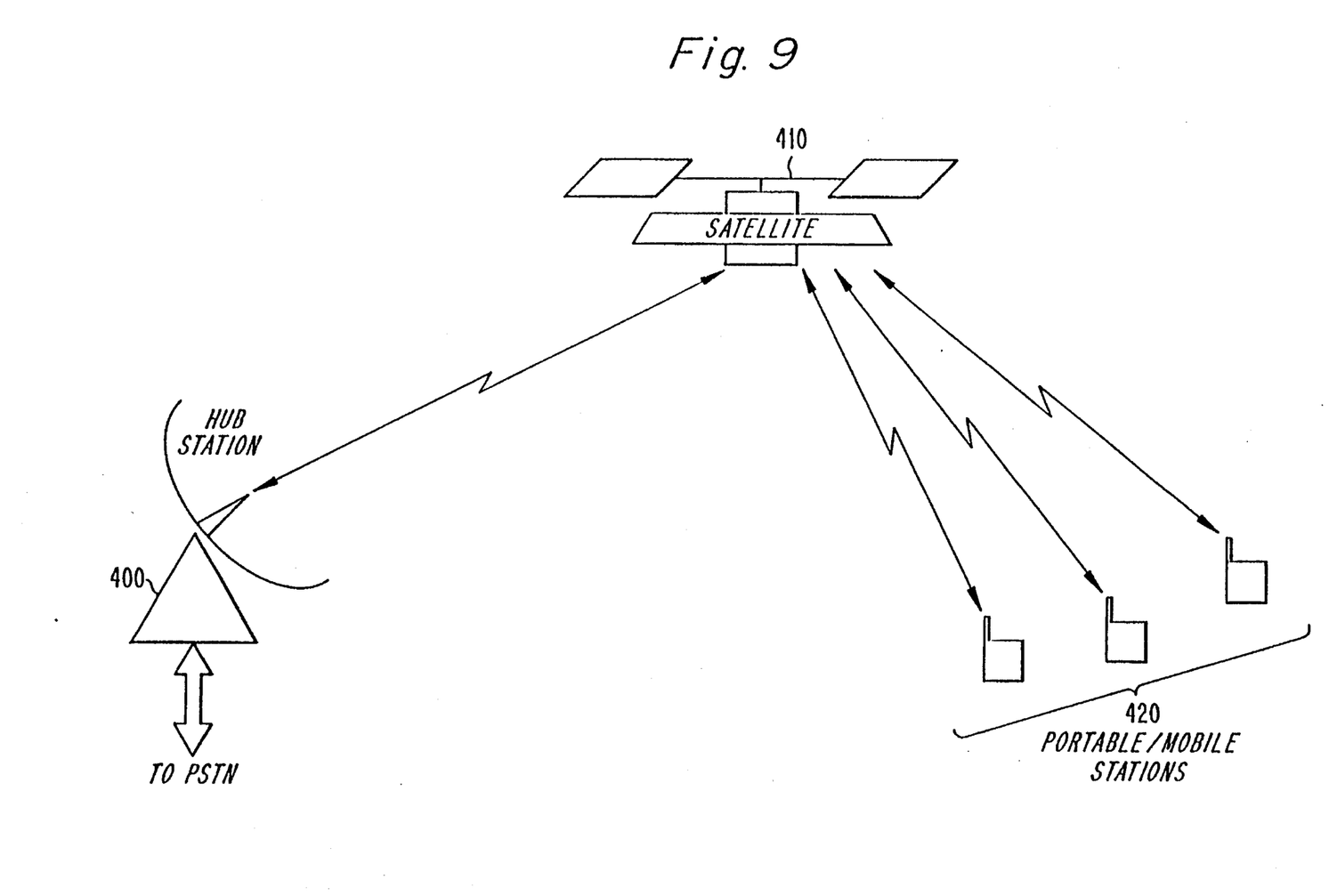
FIG. 9 illustrates satellite/mobile communications in one embodiment of the present invention.

FIG. 9 illustrates a block diagram of satellite communications system for one embodiment of the present invention. An orbiting satellite 410 is in communication with at least one ground station or called the HUB 400 as well as with a number of portable mobile phones 420. The phones are each serviced by an appropriate antenna beam from a multiple spot-beam antenna on the satellite providing high gain in the direction of each phone. The HUB communicates with the satellite using, for example, C-band or Ka-band frequencies, while the satellite communicates with the phones using, for example, L-band (uplink) and S-band (downlink) frequencies. In most cases, most calls will be between satellite phones and ordinary phones belonging to the public switched telephone network. The HUB station accepts calls from the PSTN and relays them to the mobile phone via the satellite, and conversely accepts calls from the mobile phones relayed from the satellite and connects them to the PSTN. A small percentage of calls can be mobile to mobile calls, and the HUB directly connects them to each other without necessarily involving the PSTN. In some systems, two or more HUBS located in different parts of the world communicate with the same satellite. In this case, mobile to mobile calls may involve Hub-to-Hub connections which can be accomplished through international trunk lines that may be part of the PSTN system. Alternatively, the satellite HUB links can allocate some capacity for Hub-to-Hub communication via the satellite for such occurrences thus avoiding landline tariffs.

Figure 10:
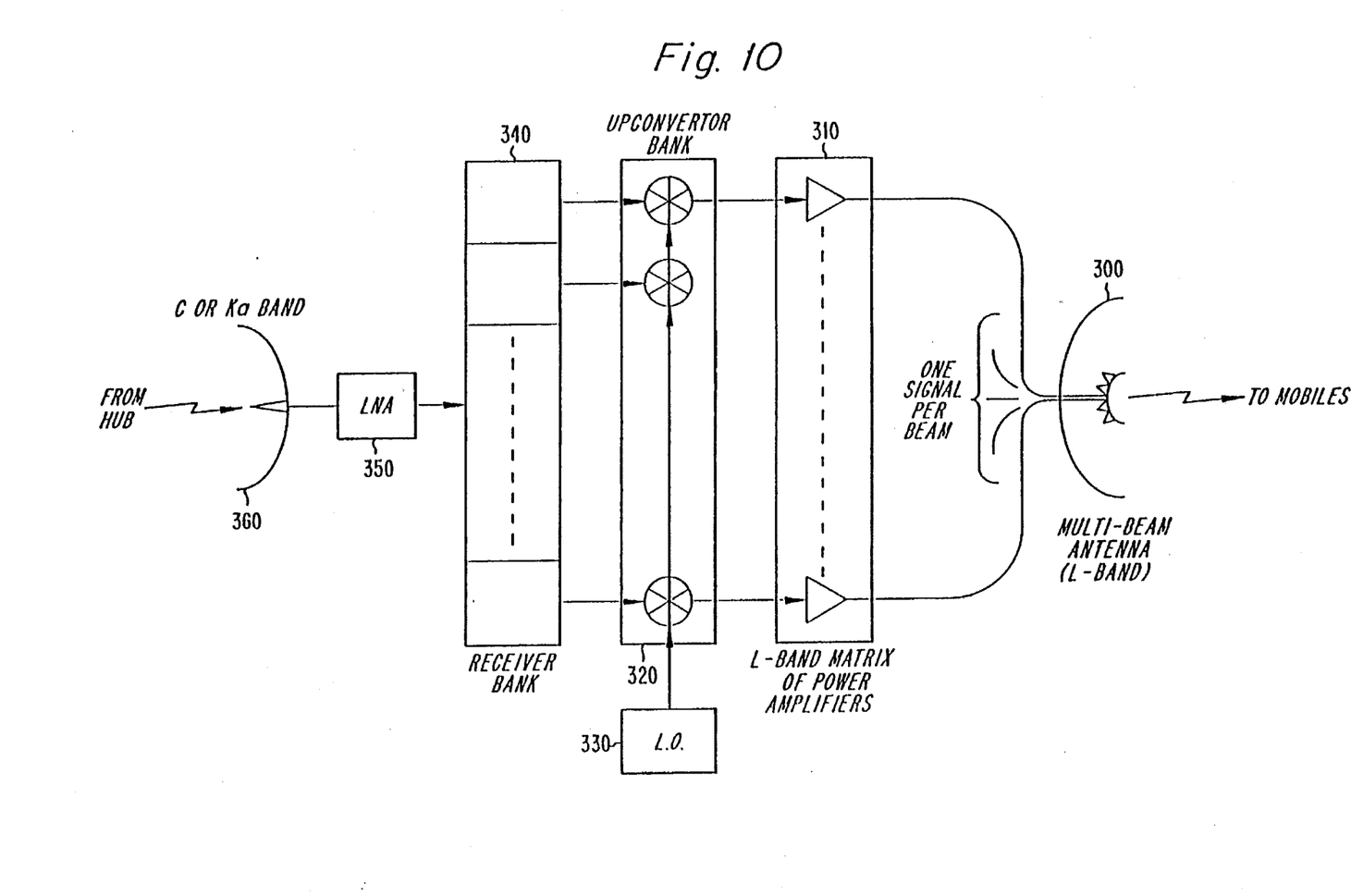
FIG. 10 illustrates a hub-to-mobile satellite transponder.
Figure 11:
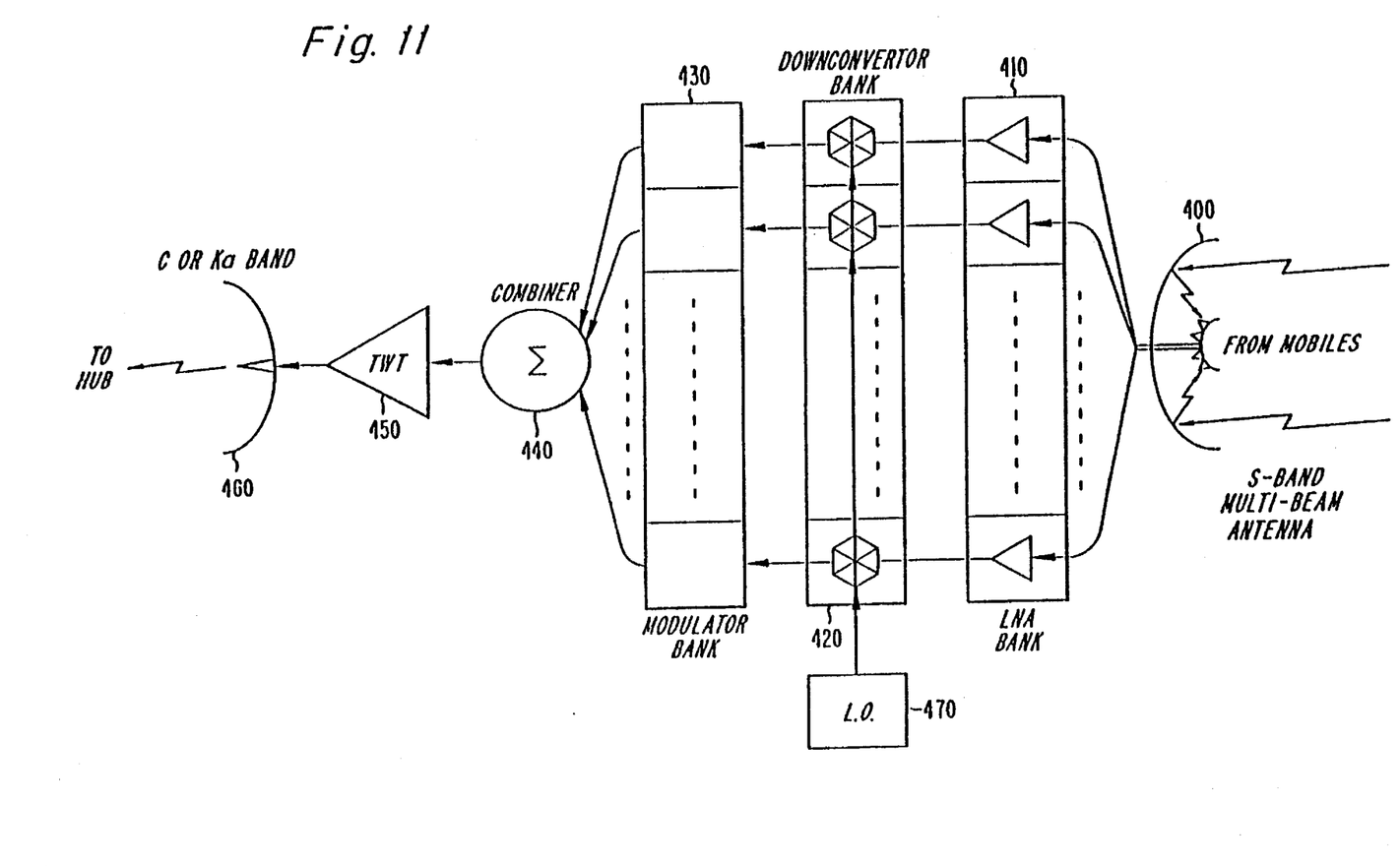
FIG. 11 illustrates a mobile-to-hub satellite transponder.

FIGS. 10 and 11 illustrate a satellite communications payload suitable for one embodiment of the present invention. FIG. 10 illustrates the downlink to the mobile phones while FIG. 11 illustrates the uplink from the mobile phones. Referring now to FIG. 10, an antenna 360 receives a number of signals from the HUB which are demodulated or coherently downconverted using a bank of receivers 340. The receiver output signals are then coherently upconverted in a bank of upconvertors 320 by mixing with a common local oscillator 330. The upconverted signals are now at the downlink frequency and are amplified by a bank of power amplifiers 310, wherein each amplifier is coupled to one element, a group of elements, or a feed of a multi-beam antenna or phased array. In one embodiment of the present invention, the amplifiers are class C transmit power amplifiers operated at maximum efficiency. In one embodiment of the present invention, the satellite transmitter comprises saturated travelling wave tubes. The HUB is thus able by sending appropriate signals to the satellite antenna 360 to determine what signals will be broadcast by a multi-beam antenna 300 at what time and in what direction. In this manner, it can be determined, for example, that in any particular time slot of the down TDM format only a subset of regions of the earth receive the signals, the regions being sufficiently separated in boresight angle so that they do not suffer interference from one region to another. In this way, independent signals can be sent to one phone in each region in each timeslot without interference. In the next timeslot, a different set of regions, i.e., those in between the first set of regions, are illuminated so that all regions receive the signal from some timeslots in the frame. Copending U.S. Pat. application Ser. No. 08/179,953 entitled "A Cellular/Satellite Communication System With Improved Frequency Reuse", filed Jan. 11, 1994, which is incorporated herein by reference, discloses how one to one re-use can be used for the present embodiment wherein every timeslot is used in all of a number of sub-regions.

When the system is operating at less than full capacity, not all of the timeslots in the frame will be active. Moreover, one half of a two party conversation is generally silent at any time so that an advantage can be gained by turning off the signal in the corresponding timeslot momentarily. When the number of timeslots is large, i.e., 512, it is statistically accurate to assume that only approximately 50% will be active at the same time. The power amplifiers 310 are arranged to draw little or no current during inactive or unallocated timeslots so that the mean consumption from the satellite prime power supply corresponds, even when fully loaded, to only half the power amplifier peak power consumption. For a given size solar array, the power amplifier peak power can thus be dimensioned to twice the value which the solar array otherwise would support.

Furthermore, peak capacity is reached only at certain times of the day, whereas the solar array converts the sun's energy into electrical power during a full 24 hour period. By using a rechargeable battery to average the power consumption in 24 hours, a further factor increase in peak transmitter power can be made relative to the continuous load the solar array can support. An advantage of TDM downlink used in the present invention is that current consumption reduces in direct proportion to the under-utilization factor, in contrast with an FDMA or CDMA downlink which use power amplifiers which only reduce their current consumption by the square root of the under-utilization factor, if at all. Therefore, using a TDM downlink allows the full benefit to be taken of the average under-utilization factor.

In one embodiment of the present invention, the active time slots of any TDM signal are packed together to occupy adjacent time slots in a subframe period which is a portion of the TDM frame period. The inactive time slots form the rest of the TDM frame period. The subframe of any TDM signal retransmitted in one of the multiple satellite antenna beams does not overlap the subframes of the TDM signals transmitted in the neighboring beams.

Referring now to FIG. 11, a multi-beam antenna or multi-element phased array 400 receives signals on the uplink frequency from a plurality of mobiles. Mobiles in the same region of the earth use different FDMA channel frequencies on the uplink and according to the invention do not transmit during their received timeslots on the TDM downlink. Mobiles in a different region of the earth use the same set of frequencies as mobiles in the first region, therefore the antenna 400 receives a plurality of signals on each FDMA channel that arrive from different directions. In the case of a multi-beam antenna such as a parabola with space feeds, the different directions correspond to different beams so that signals on the same frequency appear in different beams and can thus be separated. This may require that adjacent beams do not contain the same frequencies, but that an adequate re-use factor is employed such as the three to one frequency re-use pattern illustrated in FIG. 6. When uplink FDMA channels are associated with corresponding downlink TDMA timeslots, the use of a three-to-one time re-use pattern on the downlink as disclosed above automatically gives rise to a three-to-one frequency re-use pattern on the uplink, thus achieving separation of signals. On the other hand, a one-to-one re-use frequency pattern can be achieved for the uplink using the configuration of FIG. 10 particularly when antenna 400 is a phased array.

The antenna 400, whether a multi-feed parabola or multi-element phased array, presents a number of RF ports containing a plurality of mobile uplink signals. A bank of low noise amplifiers 410 and downconvertors 420 amplify these signals and coherently downconverts them using a common local oscillator 470 to a suitable intermediate frequency for amplification and filtering. The downconverted filtered and amplified signals are then applied to a bank of upconvertors or transmitter modulators 430 which translate the signals to the C or Ka bank while preserving their phase relationships before adding them in a combiner 440 and amplifying them in a traveling wave tube TWT power amplifier 450 for transmission to the HUB station through an antenna 460. It should be noted that the antenna 460 in FIG. 11 may be the same as the antenna 360 in FIG. 10, the C/Ka bank receiver then being separated from the transmitter by means of a duplex filter. Moreover, both polarizations may be used in both directions in order to increase bandwidth utilization. Each polarization would then have associated with it half of the receiver bank 340 and half of the transmitter bank 430 connected to a separate traveling wave tube. Furthermore, a downlink antenna 300 and the uplink antenna 400 can also in principle be one and the same with the addition of transmit/receive duplexing filters for each beam, array element or sub-array, thus achieving double use of the same antenna aperture.

A description of the corresponding HUB station equipment may be found in the aforementioned U.S. Pat. application Ser. No. 08/179,053, entitled "A Cellular/Satellite Communication System With Improved Frequency Re-use", which is hereby incorporated by reference.

It will be appreciated by those or ordinary skill in the art that the number of timeslots, frequency bands and applications mentioned above are primarily for the purpose of illustration and are not meant to imply any limitation of the present invention. The present application contemplates any and all modifications that fall within the spirit and scope of the underlying invention disclosed and claimed herein.

What is claimed is:

1. A communication system for providing telephone communications between a number of outstations in a subscriber and a public switched telephone network comprising at least one orbiting satellite and at least one hubstation in communication with said satellite and said public switched telephone network comprising:

at least one orbiting satellite in communication with at least one of said outstations and said hubstation, said satellite including:

multiple beam antenna means for illuminating different areas on the earth with signals to be transmitted from said satellite to said outstations;

multiple transmitter means for generating said transmit signals associated with respective beams of said multiple beam antenna means; and multiple receiver means for receiving signals from said hubstation to be retransmitted by said multiple transmitter means and respective beams of said multiple beam antenna;

at least one hubstation in communication with at least one orbiting satellite, comprising:

multiple multiplexed means for multiplexing signals intended for retransmission from said satellite using a particular beam of said multiple beam antenna into respective active time slots of a corresponding time division multiplex frame also including inactive time slots to produce corresponding TDM signals;

multiple transmitter means in radio communication respectively with said multiple satellite receiver means for transmitting said corresponding TDM signals such that each TDM signal is retransmitted from a corresponding one of said multiple satellite antenna beams; and time slot allocating means to allocate said active time slots in each beam so that they coincide with inactive time slots in neighboring beams.

2. A satellite communication system according to claim 1, wherein said satellite multiple transmitter means comprise saturated travelling wave tubes.

3. A satellite communication system according to claim 1, wherein said satellite multiple transmitter means comprise class C transmit power amplifiers operated at maximum efficiency.

4. A satellite communication system according to claim 3, wherein said transmit power amplifiers are powered down to a low current during inactive or unallocated time slots of the respective TDM signals.

5. A satellite communication system according to claim 4, wherein said active time slots of any TDM signal are packed together to occupy adjacent time slots in a subframe period being a portion of said TDM frame period and said inactive time slots form the rest of said TDM frame period.

6. A satellite communication system according to claim 5, wherein said subframe of any one TDM signal retransmitted in one of said multiple satellite antenna beams does not overlap the subframes of the TDM signals transmitted in the neighboring beams.

7. A communication satellite system for providing telephone communications between a number of outstations and a subscriber in a public switched telephone network comprising at least one orbiting satellite and at least one ground control station in communication with said satellite and the public switched telephone network, comprising:

at least one orbiting satellite in communication with at least one of said outstations and said control station, said satellite comprising:

multiple beam antenna means for receiving uplink signals from groups of said outstations located in respective regions of the earth and transmitting corresponding downlink signals to said outstations;

first multiple receiver means each associated with one of said multiple antenna beams for receiving said uplink signals;

first multiple transmitter means coupled to said first multiple receiver means for relaying said received signals to said control station;

second multiple receiver means for receiving time division multiplex signals from said control station; and second multiple transmitter means each associated with one of said multiple antenna beams and coupled to said second multiple receiver means for relaying said TDM signal to said outstation;

at least one control station in communication with said at least one orbiting satellite, comprising:

multiple receiver means for receiving said relayed uplink signals from said satellite;

multiple transmitter means for transmitting time division multiplex signals to said satellite for retransmission by said satellite to said outstations in corresponding downlink satellite antenna beams; and time slot and frequency allocating means to associate uplink channel frequencies used by said outstations for transmitting with downlink time slots used by said outstations for receiving such that allocated downlink time slots and associated uplink frequencies in one of said multiple antenna beams correspond to unallocated time slots and frequencies in neighboring beams.

\* \* \* \* \*